No. 638,119. Patented Nov. 28, 1899.
F. M. HIGGS.
SWIVEL ACTION CULTIVATOR.
(Application filed July 21, 1899.)
(No Model.)
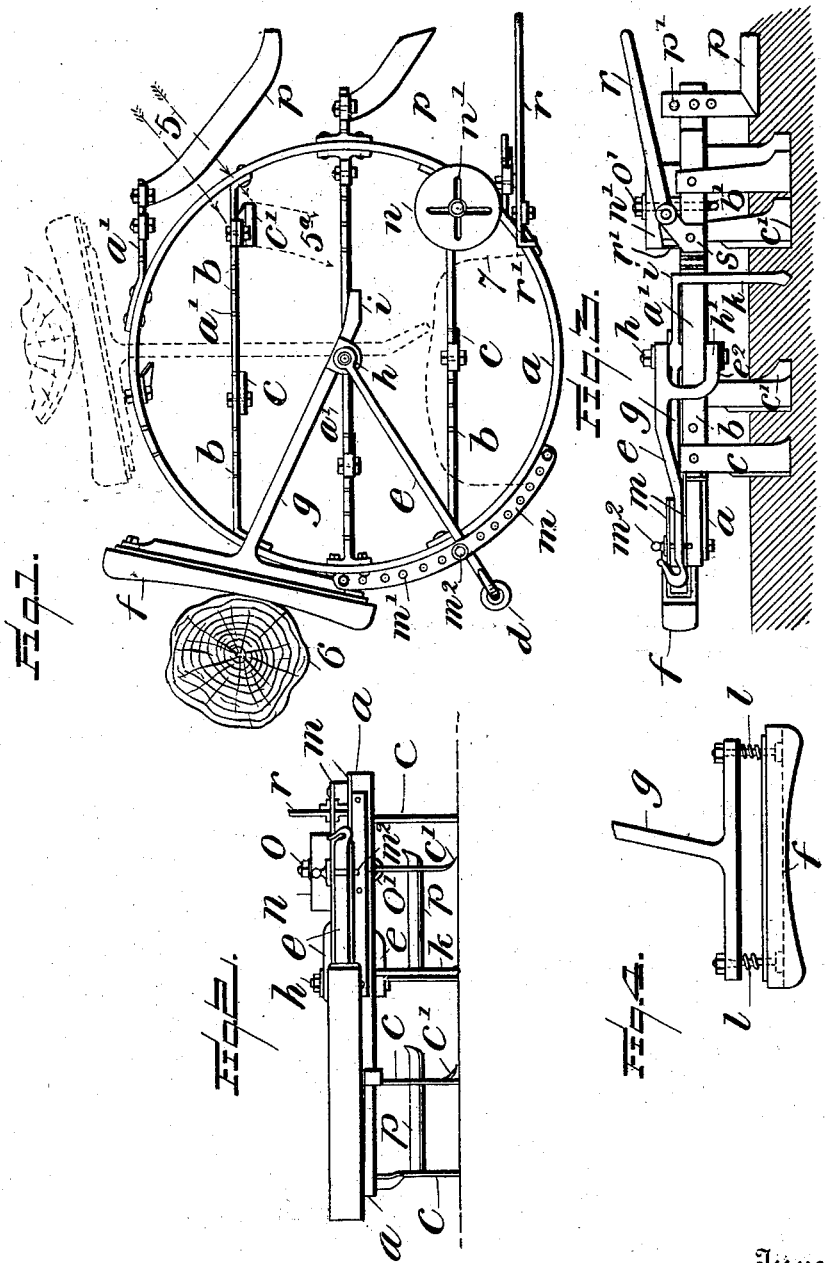

UNITED STATES PATENT OFFICE.

FREDERICK MARSHALL HIGGS, OF KVABRAM, VICTORIA.

SWIVEL-ACTION CULTIVATOR.

SPECIFICATION forming part of Letters Patent No. 638,119, dated November 28, 1899.

Application filed July 21, 1899. Serial No. 724,717. (No model.)

*To all whom it may concern:*

Be it known that I, FREDERICK MARSHALL HIGGS, a subject of the Queen of the United Kingdom of Great Britain and Ireland, residing at Kvabram, in the Colony of Victoria, have invented certain new and useful Improvements in Swivel-Action Cultivators; and I do hereby declare the following to be a full, clear, and exact description of the invention, such as will enable others skilled in the art to which it appertains to make and use the same.

The object of this invention is to produce an agricultural implement capable of tilling the soil not only in any ordinary position, but also in close proximity to the trunks or stems of trees, shrubs, and vines and under the foliage thereof even when the latter approaches comparatively close to the ground.

One improvement which this implement embodies is the use of a lever or swivel arm which projects from the frame or body of the implement, so as to be adapted to be the first part of the implement to come into contact with each tree-trunk or the like close to which cultivation is required, the outer extremity of said lever acting as a fulcrum, which to some extent moves (or may move) forward while touching the tree when the said fulcrum comes into operation. The effect is that the implement advances in a curved path instead of in the straight path it would otherwise continue to take. This outer extremity is termed the "fender," as it is constructed of leather or otherwise made smooth and soft enough to prevent injury to the tree, while its forward motion during contact therewith is much retarded, as already explained.

There are other novel features of construction which will hereinafter appear, and it will also be seen hereinafter that some features used in the general combination of parts may be diversified at will to suit the varying kind of treatment that is to be given to the soil.

In this implement its highest point can be made so low as to pass under foliage approaching comparatively near to the level of the soil, if so desired much less than one foot above the said soil. The tines (or some of the tines) used to cultivate the earth with this implement are set so as to travel ordinarily more on edge than broadside on, and this not only prevents the earth clogging under the implement-frame, but also gives lighter cultivation and greater ease of draft than when the cultivating-feet come more broadside on, as they do, however, during the time when they make the curved path around or partly around each tree the fender strikes.

Referring to the attached sheet of drawings, in which is illustrated this invention, Figure 1 shows in plan view a cultivator with its fender contacting with the trunk of a tree, the dotted lines indicating the relative positions of the cultivator and its fender and the tree while passing the latter. Fig. 2 is an elevation facing the fender and draft-lever. Fig. 3 is a side elevation of the cultivator with part of the frame broken away, as indicated by the line 7 in Fig. 1, showing the tines in the soil; and Fig. 4 is a plan view of a modified form of the fender.

The operation of the implement is so largely automatic that an attendant cannot well injure trees by its use, although, naturally, a little practice is advantageous.

The construction is as follows: $a$ indicates a frame of any size, made circular or partly or approximately circular, whereby projections calculated to injure trees or vines are avoided and whereby the "swivel" and curving actions are facilitated. This frame is furnished with any suitable supports or beams $a'$, to which are attached cultivator blades, shares, tines, or teeth $c$ of any approved kind, such as those shown. The attachment, as shown in Fig. 1, may be by simple bolting through any suitable holes $b$ in the beams. Whatever form or forms of tines be used to stir, turn up, or cut the soil, a sufficient number of these (of any desired size) are arranged to enter the ground at an angle to the line of travel of the implement indicated, such as the draft-lever $e$ in Fig. 1, so that when the implement is being drawn along (say, by a horse) it will automatically be steered by the tines in a path several feet to one side of and (except when encountering trees or obstacles) parallel to the horse-path, the said horse-path being necessarily clear of the branches of each tree 6, while the tine-path would be under said branches. The first aforesaid exception to the parallelism is when the fender $f$ on the swivel or swinging arm $g$ (integrally or suitably attached) of the implement contacts with a tree, as 6, in which case the implement describes a curve, with the tree as the approximate center. In Fig. 1 the end of the chain or connection between horse and implement is marked $d$. The implement also by reason of the set of the draft and of the tines will free itself or swerve aside from various obstacles which the tines may meet in or on the ground. In Fig. 1 the arrows 5 show approximately the edges of the path formed by one of the tines of the implement when going in a straight line, and the arrows $5^a$ show how the curved path begins as a consequence of tree 6 preventing the straight onward movement of the implement when the fender projects to one side of the front of the frame, as shown. The draft-lever $e$ and the swivel-lever $g$ are both pivotally connected, as by a central pin $h$, to a suitable point within the framing. The fender is suitably arranged to avoid undue shock to small trees. Thus it may have springs $l$, Fig. 4, supporting it or be pneumatic, many of the variations now well known in connection with cycle-tires being applicable. The inner end of the swivel-lever $g$ extends a short distance beyond the pivot at $h$ to a point $i$, where it has a downwardly-extending tooth $k$, which is herein called the "rudder." The tooth enters the soil, and when the implement is being drawn along it naturally assumes (owing to the resistance of the earth) such a position as the framing $a'$ or any other suitable stop provided, allows. This position (shown in Fig. 1) is so predetermined that the fender $f$ shall project normally at the desired place at the front of the implement (a little to one side)—that is, in the position to make proper contact with any tree which the implement may be nearing. On such contact taking place the fender will be retarded, as already stated, and as the horse drawing the implement continues to advance the implement describes a curve and ultimately leaves the tree, the fender having meanwhile moved to about the position shown by broken lines in Fig. 1. As soon as the fender is clear of the tree again the resistance of the soil to the rudder $k$ swings the fender to the front again.

The rudder may be integral with lever $g$, but is preferably wholly or partly separable to allow of renewal or adjustment at any time. Instead of the rudder other means of bringing the fender forward again might be used, such as a spring between the swivel-lever and the framing.

In order to aid in regulating the steering of the implement, the radial sweep of draft-lever $e$ is made controllable, and one suitable means for this purpose is the single or double bar bridle $m$, with holes $m'$ and peg $m^2$ adjustable through any suitable holes. In Fig. 2 the two bars of the bridle (which may be considered simply a part of the framing) are seen. The outer part of the lever $e$ is thus provided with a bearing (against said peg $m^2$) during work, and the lever has its range of possible movement during the said work restricted. The strain of the draft-lever is mainly on the center $h$, to which it is connected in any suitable manner; but there is also a varying pressure on the peg $m^2$. To prevent undue depression of the front of the implement, the lever $e$ is preferably connected by an arm $e^2$ to the pin $h$ at point $h'$, as shown.

In using this implement it is necessary in some soils to weight it to cause it to enter deeply enough into the ground, and also by placing the weight at the rear to insure more even depth of work by the different tines. For this purpose there is when required an adjustable weight $n$, attached by any suitable means, such as a bolt $o$ with nut, and the bolt being provided with a hooked end $o'$, as seen most clearly in Figs. 2 and 3, engages beneath one of the beams $a'$ and passes through radially-arranged slots $n'$ in the weight $n$, where it is adjustably secured by means of a nut thereon. The weight may, however, be attached in various other ways—for example, it may be fitted to slide, (on a bar attached to the frame,) as on a steelyard. In practice the weight is located at the side of the rear of the implement opposite to the fender, the suitable placing of the weight soon being understood by the operator. The front tines or the like may be somewhat longer than the rear ones, so as thus also to facilitate securing an equal depth of cultivation, but this is not an essential.

In the implement shown in the drawings the bases of some of the tines are curved laterally, as shown at $c'$, to secure a better grip of the soil and retain depth of cut. An adjustable removable knife, adapted to more or less deeply skim the soil as the implement progresses and cut any weeds met with, may be attached to the implement, as shown at $p$. Each such knife may be fastened to the framing or to an attachment thereto by clamping or by bolts through one or other of the holes $p'$ in $p$, Fig. 3. The use of any knife $p$ is often unnecessary. $r$ is a short handle projecting rearwardly, by which the machine can be lifted or guided, and this handle may occasionally be found useful. As shown, it is pivoted to a bracket $s$, and its end $r'$ bears on frame $a$.

Many modifications in the hereinbefore-described device might be made without departing from the spirit of my invention.

What I claim as my invention, and desire to secure by Letters Patent of the United States, is—

1. In a cultivator of the class described, a swivel or swinging lever having at one end which projects beyond the frame of said cultivator, a fender, provided with a yielding buffer, and having a tooth or rudder at its rear end arranged to engage in the earth as the cultivator moves forward, and to keep the fender normally in its forward position; substantially as described.

2. In a cultivator of the class indicated a swivel or swinging lever having at one end which projects beyond the frame of said cultivator a fender and also having a rudder to keep the fender normally in its forward position substantially as and for the purposes set forth.

3. In a cultivator of the class indicated, a movable fender projecting outside the frame toward the front and an adjustable weight connected to such frame toward the rear thereof all in combination substantially as and for the purposes set forth.

4. In a cultivator of the class indicated, the combination with the frame having a fender at the end of a swivel-lever and a weight adjustable in position relatively to said frame; of a draft-lever pivoted centrally to the frame and having means to regulate its range of movement and its bearing-point all substantially as set forth.

5. In a cultivator of the class indicated, the combination with the frame of beams as $a'$ a center pivot as $h$, to which are connected a draft-lever, and a lever carrying a fender substantially as and for the purposes set forth.

6. In a cultivator of the class indicated, the combination with a centrally-pivoted draft-lever $e$, of a bridle $m$, with adjustable peg or the like $m^2$ substantially as and for the purposes set forth.

7. In a cultivator of the class described, the combination with the frame carrying the teeth, of an arm pivoted centrally of said frame and having one end extending beyond the periphery thereof, a fender carried by the said end of the arm, and the other end of said arm extending in an opposite direction and carrying a depending tooth for engagement in the earth; substantially as described.

8. In a cultivator of the class described, the combination with the frame carrying the teeth, of an arm pivoted centrally of said frame and having one end extending beyond the periphery thereof, a fender carried by the said end of the arm, and the other end of said arm extending in an opposite direction and carrying a depending tooth for engagement in the earth; and an adjustable weight mounted upon the said arm; substantially as described.

9. In a cultivator of the class described, the combination with the frame provided with series of beams; of a slotted weight; a bolt having a hooked end for engaging beneath one of said beams, the said bolt passing through the said slot in the weight and a nut coöperating with said bolt adjustably securing the weight upon one of said beams; substantially as described.

In testimony whereof I affix my signature in presence of two witnesses.

FREDERICK MARSHALL HIGGS.

Witnesses:
  G. G. TURRI,
  W. H. CUBLEY.